US006966256B2

(12) United States Patent
Canizares et al.

(10) Patent No.: US 6,966,256 B2
(45) Date of Patent: Nov. 22, 2005

(54) FOOD PRESS WITH PIVOTAL STRAINER PLATE

(75) Inventors: Wilfrido Loor Canizares, Brooklyn, NY (US); Boris Kontorovich, Brooklyn, NY (US)

(73) Assignee: Helen of Troy Limited, Bridgetown (BB)

( * ) Notice: Subject to any disclaimer, the term of this patent is extended or adjusted under 35 U.S.C. 154(b) by 0 days.

(21) Appl. No.: 10/273,163

(22) Filed: Oct. 17, 2002

(65) Prior Publication Data

US 2004/0074403 A1    Apr. 22, 2004

(51) Int. Cl.[7] .............................................. B30B 9/06
(52) U.S. Cl. ...................... 100/126; 100/131; 100/213; 100/234; 100/243
(58) Field of Search ........................ 100/110, 116, 126, 100/127, 131, 132, 213, 231, 243, 234, 112, 100/130; 99/495

(56) References Cited

U.S. PATENT DOCUMENTS

| 581,526 | A |  | 4/1897 | Straube |
|---|---|---|---|---|
| 584,805 | A |  | 6/1897 | Wonders |
| 620,047 | A |  | 2/1899 | Neal |
| 694,617 | A |  | 3/1902 | Coomber |
| 2,776,616 | A |  | 1/1957 | Sarossy |
| 4,069,752 | A |  | 1/1978 | Ahner |
| 4,466,346 | A |  | 8/1984 | Gemelli |
| 4,545,299 | A |  | 10/1985 | Ahner |
| 4,582,265 | A |  | 4/1986 | Petronelli |
| 4,794,854 | A |  | 1/1989 | Swaim |
| 5,101,720 | A |  | 4/1992 | Bianchi |
| D350,261 | S |  | 9/1994 | Ahner |
| 5,463,941 | A |  | 11/1995 | Gibson |
| 5,467,699 | A |  | 11/1995 | Laib |
| D364,999 | S |  | 12/1995 | Malinosky |
| D366,816 | S |  | 2/1996 | Laib |
| 5,513,562 | A |  | 5/1996 | Moor |
| 5,520,104 | A |  | 5/1996 | Ancona et al. |
| 5,791,237 | A |  | 8/1998 | Gibson |
| D425,762 | S |  | 5/2000 | Short et al. |
| 6,109,170 | A |  | 8/2000 | Short et al. |
| 6,234,074 | B1 | * | 5/2001 | Mangum ..................... 100/110 |
| 6,237,474 | B1 |  | 5/2001 | Short et al. |
| 6,505,548 | B1 | * | 1/2003 | Lillelund et al. ............. 99/510 |
| 6,561,084 | B2 | * | 5/2003 | Lane ........................... 99/508 |
| 2002/0069769 | A1 | * | 6/2002 | Herren ........................ 100/125 |

* cited by examiner

Primary Examiner—Derris H. Banks
Assistant Examiner—Shelley Self
(74) Attorney, Agent, or Firm—Seyfarth Shaw LLP

(57) ABSTRACT

A food press is provided having a presser arm and a presser plate which is received by a basket formed in a handle, and a pivotally attached perforated strainer plate is locatable within the basket. The strainer plate is pivotally attached to the handle at a point which is at a side of the basket opposite a hinge which pivotally attaches the handle to the presser arm. The food press provides for the pivoting of the strainer plate from a first position in the basket, where the food article may be pressed against the strainer plate, and a second position exposing the upper surface and lower surface of the strainer plate for easy access and cleaning of the perforated strainer plate.

34 Claims, 4 Drawing Sheets

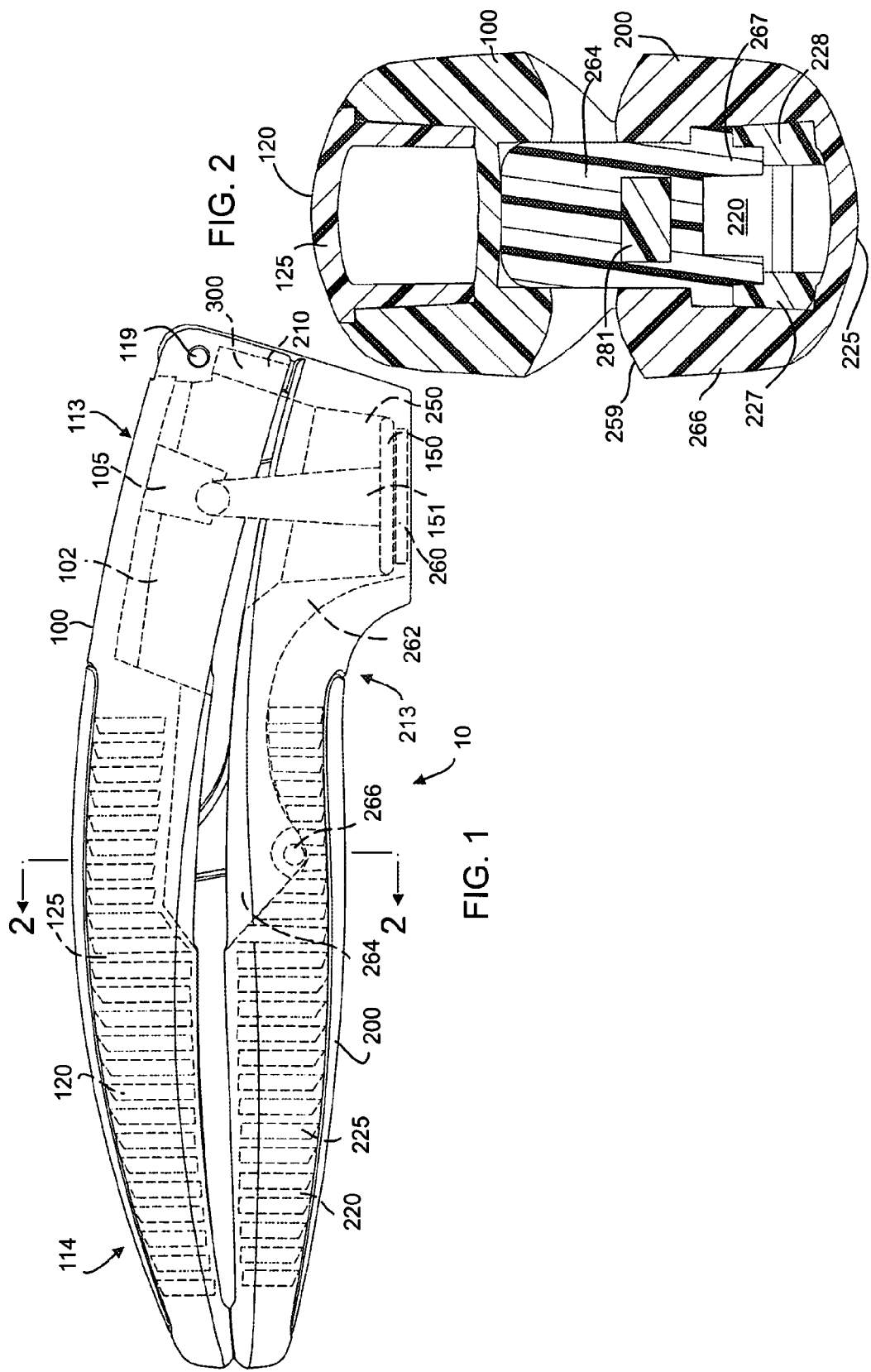

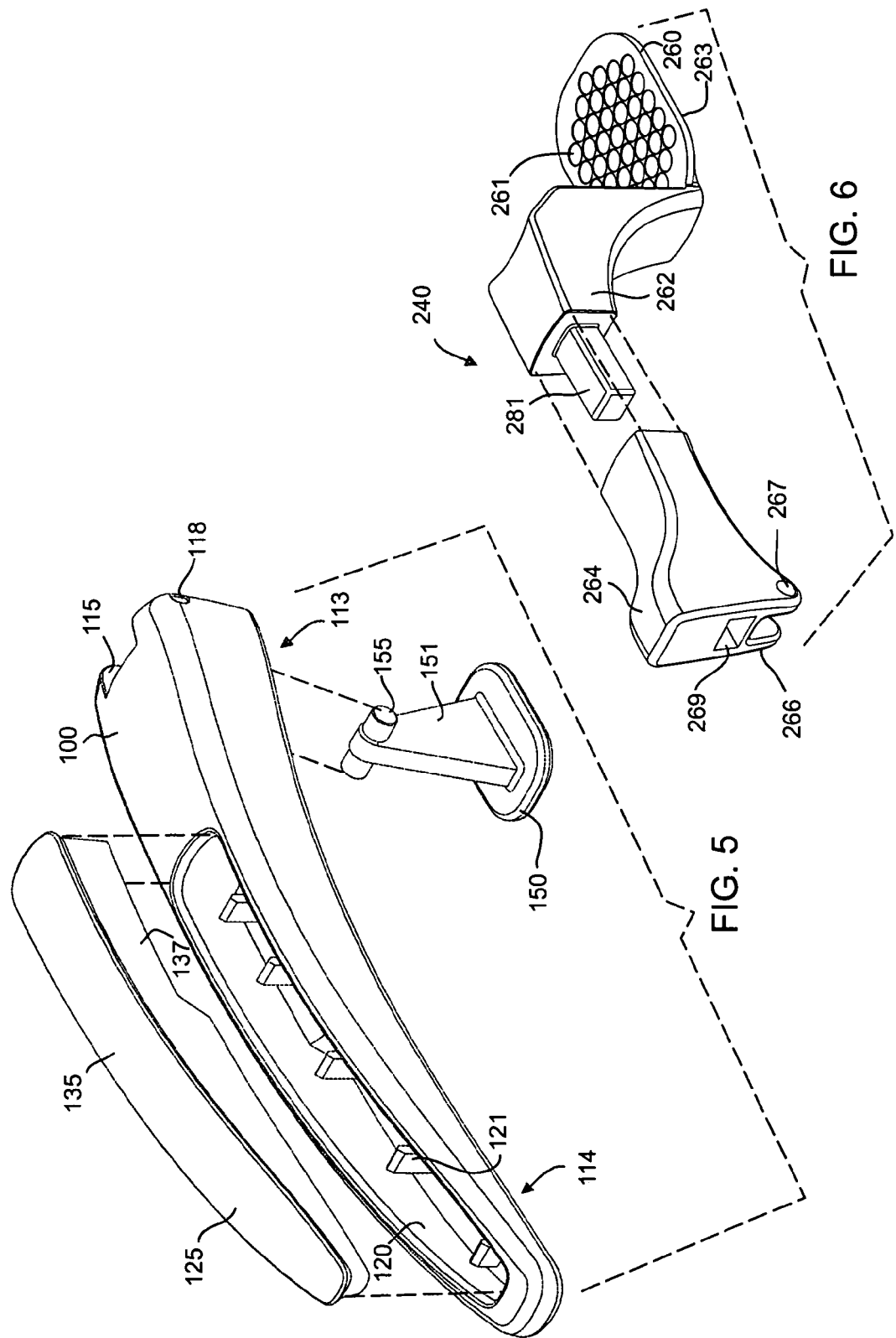

FOOD PRESS WITH PIVOTAL STRAINER PLATE

The present invention pertains to a food press and in particular a food press for pressing food articles such as garlic.

BACKGROUND OF THE INVENTION

Food presses, such as for pressing garlic, are known that have a presser arm and handle pivotally attached and a presser plate attached to the presser arm so that upon insertion of the presser plate into a basket area of the handle, a food item such as garlic received in the basket may be pressed and the juices extracted from the food article. While this construction of the presser arm pushing downward on the food article is an effective way of extracting the juice from the food article, it leaves behind residue and debris within the basket that is difficult to clean. Garlic presses have been provided having cleaning implements in order to clean the perforated area at the bottom of the basket. Such cleaning plates have included multiple pins or teeth to be inserted within the perforated area of the basket in order to help to push through the remaining debris or garlic skin. While such cleaning devices are helpful in the removal of the food debris, they are not completely successful in cleaning the basket.

For example, U.S. Pat. No. Des. 425,762 provides for a detachable cleaning tool to be attached to the handle of the garlic press when not in use and appears to be removable in order to clean the basket when the pressing of garlic is complete and cleaning is desired. However, this design does not allow for complete cleaning of the basket because the basket is not exposed on all sides to allow for unobstructed access to the perforated surfaces of the basket.

Therefore, there is desired a food press that provides for better cleaning of the basket and exposure of the basket while cleaning in order to more easily clean the basket. Such an arrangement is described in the present application.

SUMMARY OF THE INVENTION

This application discloses a food press comprising a presser arm including a distal end, a proximal end, and a presser plate pivotally attached adjacent the distal end. A handle is provided having a distal end, a proximal end, a basket adjacent to the proximal end for receiving the presser plate therein and a perforated strainer plate pivotally attached adjacent the basket by a pivot member for positioning the strainer plate within the basket. The pivot member has an axis of rotation. A hinge providing a main pivot point pivotally connects the proximal end of the presser arm to the proximal end of the handle. The strainer plate may be removably attached to the handle via a pivot member press-fit within a cutout portion of the handle. The strainer plate may be attached to the handle adjacent the basket, opposite the hinge. The strainer plate may have an arm including a pair of bosses to be received by a pair of corresponding dimples formed in the handle. In an embodiment, the basket may include a first end forming a generally cylindrical shaped opening for receiving the strainer plate and a second end forming a basket aperture communicating with a cutout portion for receiving the strainer plate arm.

In an embodiment, the basket aperture may be opened at both sides of the handle. The cylindrical opening may include a bottom aperture having a rim formed around its circumference and the rim receiving the strainer plate thereon and supporting the strainer plate when a force from the presser plate is applied to the strainer plate. A cutout portion of the handle may be formed of metal and the dimples formed by a polymer insert.

In an embodiment the polymer insert may include a pair of upstanding tabs protruding from an elongated finger placement pad. The finger placement pad may be formed of an elastomer, such as that sold under the trademark Santoprene and the upstanding tabs and dimples may be formed of polypropylene. An elongated hollow in the handle may have a pair of apertures for receiving the tabs therein upon press-fitting of the insert into the handle. The strainer plate and the arm may be formed of metal and the bosses provided on a pivot member formed of a polymer material.

In an embodiment the pivot member of the strainer arm may include a rectangular shaped aperture for receiving a corresponding shaped rectangular finger protruding from the arm of the strainer plate that is press-fit within the pivot member aperture. The pivot member may be formed of polypropylene and the strainer plate and arm may be formed of aluminum. In an embodiment, the presser arm may include an insert member to contact an operator's hand during operation of the food press. The presser arm insert may be received by an elongated aperture formed in the presser arm and shaped to allow for press-fitting of the insert therein. In an embodiment the insert may be formed of Santoprene over-modeled onto polypropylene.

The invention provides for a method of cleaning a garlic press comprising the steps of providing a presser arm having a presser plate and a handle including a basket, having a perforated strainer plate pivotally mounted therein and the presser plate received therein and the handle pivotally attached to the presser arm, pivoting a distal end of the presser arm away from the handle so that the presser plate is withdrawn from the basket, pivoting the strainer plate away from the basket so that the strainer plate is exposed above the handle and applying water to the exposed strainer plate. The method of cleaning may further comprise removing an insert provided within an aperture of the handle and cleaning the insert and the aperture. In an embodiment the method of cleaning may further comprise removing the strainer plate from a pivot arm to which the strainer plate is attached and which pivotally attaches to the handle.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIG. 1 is a side elevation view of the food press of the present invention;

FIG. 2 is a sectional view of the food press in FIG. 1 taken at line 2—2;

FIG. 5 is an enlarged exploded perspective view of the presser arm of the food press of FIG. 1; and FIG. 6 is an enlarged, perspective, exploded view of the strainer plate assembly of the food press of FIG. 1.

DETAILED DESCRIPTION OF A PRESENTLY PREFERRED EMBODIMENT

Figure 3:
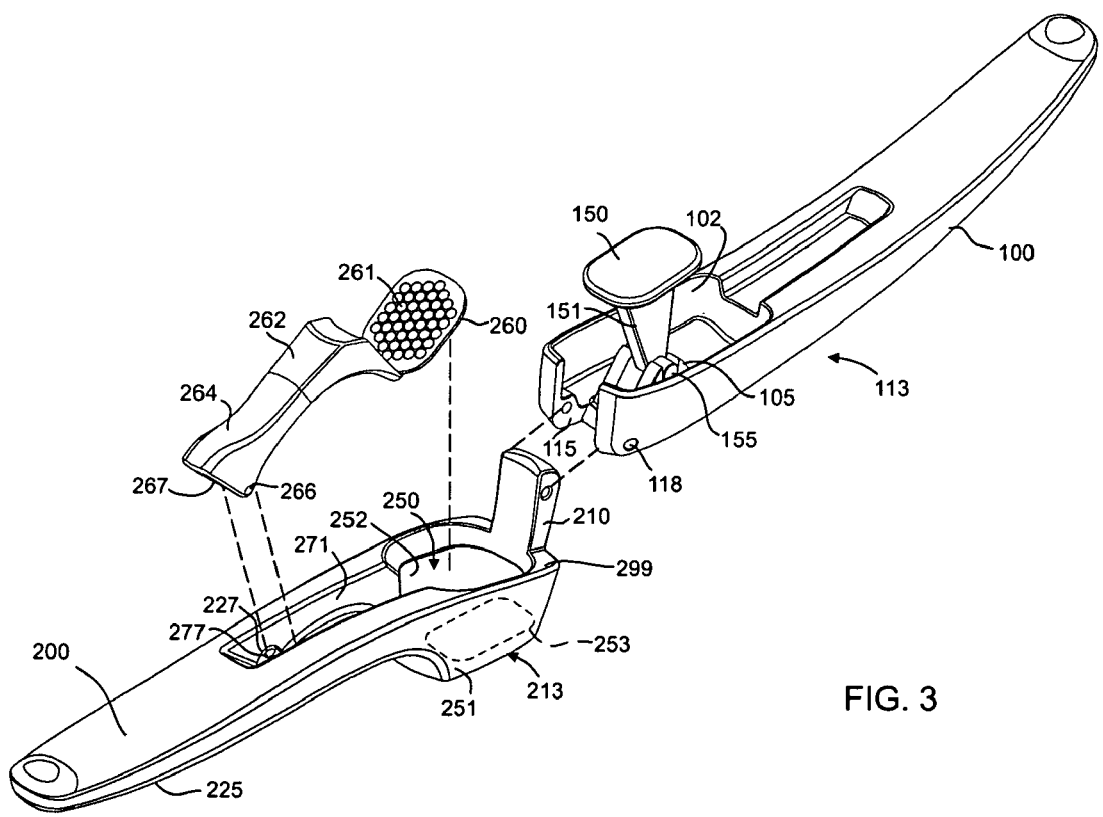
FIG. 3 is a partially exploded perspective view of the food press of FIG. 1.

Referring to FIGS. 1–6, there is illustrated a food press 10 including a presser arm 100 and a handle 200. The presser arm 100 and the handle 200 are pivotally connected at a hinge or main pivot point 300. The hinge 300 is formed of a hinge arm 210 on the handle 200 which is received within a hinge arm gap 115 of the presser arm 100. Formed within the hinge arm gap 115 (see FIG. 3) is a bore 118 which receives a pin 119 therein providing an axis of rotation for the hinge 300. The presser arm 100 also includes a presser plate 150 that is attached to the presser arm 100 at its proximal end 113, which includes a cavity 102 having a pivot arm 105 protruding therefrom to which a presser plate arm 151 is pivotally attached. Attached to the presser plate arm 151 is the presser plate 150. The presser arm 100 includes a distal end 114 which includes an elongate aperture 120 having an insert member 125 press-fit therein.

The handle 200 includes at a proximal end 213 a basket 250 for receiving the presser plate 150 therein. The bottom of the basket 250 is formed by a perforated strainer plate 260 or strainer plate. The plate 260 is attached to a strainer plate arm 262, which is attached to a pivot member 264 including a pair of bosses 266 which are attached to the handle 200 and upon which the strainer plate arm 262 pivots. The parts 260–266 form a portion of a strainer plate assembly 240. The strainer plate arm 262 may also be attached to the handle 200 by other means. For example, the pivot member 264 may also be formed in other embodiments having a pin, pintle or bore receiving a pin or other known means of providing an axis of rotation. The handle 200 also includes any elongated hollow 220 which receives an elongated finger placement pad 225.

Turning to FIG. 2, the handle 100 includes an elongated aperture 120 having an insert member 125 mounted therein. The presser arm 100 is pivotally attached to the handle 200, which includes an elongated hollow 220 having an elongated finger placement pad 225 mounted therein. Attached to the handle 200 is a pivot member 264 having bosses 266, 267. The bosses 266, 267 are received by upstanding tabs 227 and 228 of the finger placement pad 225. The pivot member 264 includes a rectangular shaped aperture 269 for receiving a rectangular finger 281 of the strainer plate arm 262 which is attached to the strainer plate 260 (FIG. 1).

Turning to FIG. 3, the presser arm 100 is detached from the handle 200 and the hinge arm 210 has been removed from the hinge arm gap 115 and the pin 119 (FIG. 1) has been removed from the bore 118. The presser arm 100 includes a cavity 102 that includes a pivot arm 105 upon which is pivotally mounted the presser plate 150. The presser plate 150 includes a presser plate arm 151 that includes a pintle 155 that is pivotally received by the presser plate arm 105. The cavity 102 is formed at the proximal end 113 of the presser arm 100.

The handle 200 includes at its proximal end 213 a basket 250 having a first end having an opening 251 and a basket aperture 252 extending between the opening 251 and a second end and in communication with a cutout portion 271. The cylindrical shaped opening 251 includes a rim 253 upon which the strainer plate 260 lies when it is received within the basket 250.

The presser plate 150 in a preferred embodiment has a pressing surface that is smooth. In an alternate embodiment, the pressing surface of the presser plate 150 may have dimples protruding therefrom which are oriented on the pressing surface of the presser plate 150 corresponding to and received by the perforations of the strainer plate 260 to which the presser plate 150 applies a pressing force. The strainer plate 260 includes perforations 261 formed in the plate so that food items received on the strainer plate 260 within the basket 250, upon being pressed by the presser plate 150 can be strained and grated and ejected therethrough. The strainer plate 260 is attached to strainer plate arm 262 which is attached to a pivot member 264.

Figure 4:
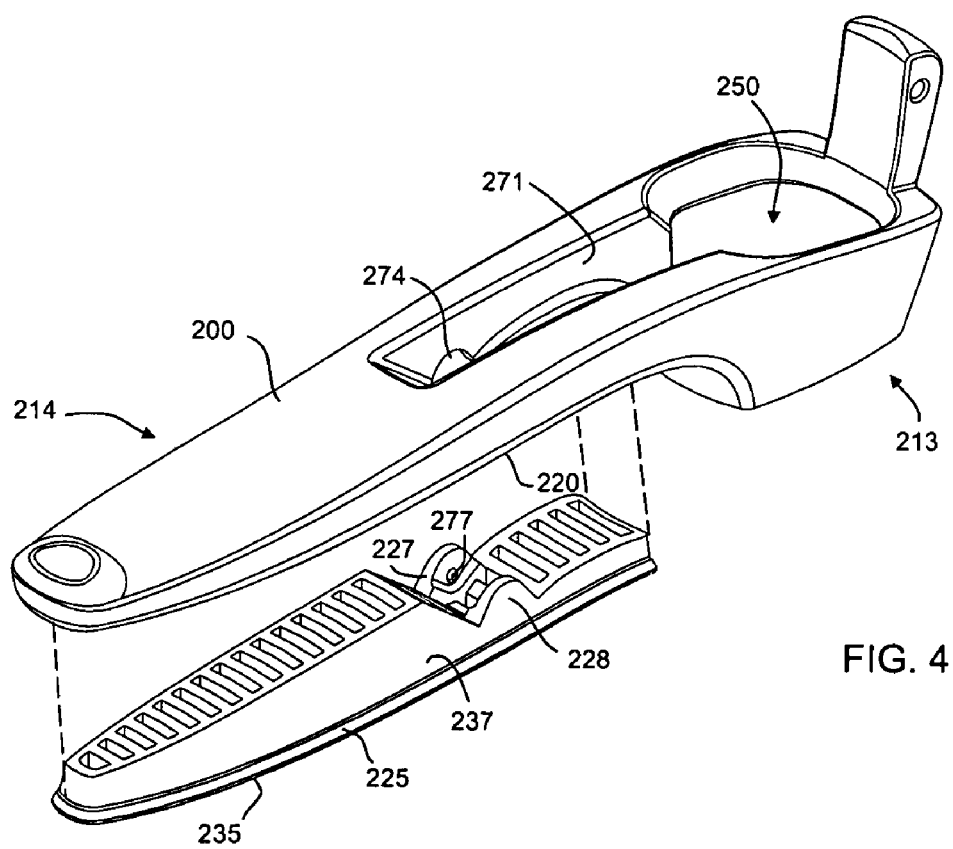
FIG. 4 is an enlarged exploded perspective view of the handle of the food press of FIG. 1.

The pivot member 264 includes bosses 266, 267 which are received within cutout portion 271 and the boss 267 is received by a dimple 277 which is formed from a upstanding tab 227 of the finger placement pad 225 mounted within the handle 200 (see FIG. 4). When the presser plate assembly 240 is received within the cutout portion 271 of the handle 200 the bosses 266, 267 of the pivot member 264 are press-fit into the pair of dimples 277 to retain the pivot member 264 therein and to allow the presser plate assembly 240 to pivot and for the presser plate 260 to be received within the basket 250. It may be understood that the presser plate 260 may be pivoted between a first position, wherein the presser plate 260 is abutting the rim 253 of the basket 250, and a second position, wherein the strainer plate 260 has been pivoted up and out of the basket 250 and elevated above the upper surface 299 of the handle 200.

In the preferred embodiment, the strainer plate assembly 240 (FIG. 6) is displaced from the hinge 300 or main pivot point (FIG. 1) and oriented on the handle 200 on the opposite side of the basket 250 from the main pivot point 300. In an alternate embodiment the pivot member 264 of the strainer plate assembly 240 may be attached adjacent main pivot point 300. The pivot point 300 may be displaced in other ways from the axis of rotation of the pivot member 264 of the strainer plate assembly 240 and each pivot axis is not co-linear.

FIG. 4 discloses the handle 200 having the basket 250 formed at a proximal end 213. An elongated hollow 220 is formed in the handle 200 beginning at the distal end 214 and running to a position adjacent the basket 250 and in communication with the cutout portion 271. Received in the elongated hollow 220 is the elongated finger placement pad 225. In a preferred embodiment the elongated finger placement pad 225 is made of a polymer material which provides for a flexible, comfortable finger placement pad area 235 for placement of an operator's fingers to press against while applying pressure and squeezing the handle 200 and presser arm 100 together. The elongated pad 225 includes a major body portion 237. In a preferred embodiment the major body portion 237 is formed of polypropylene and the pad finger area 235 is formed of Santoprene TPE, which is overmolded onto the polypropylene major body portion 237. The body portion 237 of the finger placement pad 225 includes upstanding tabs 227, 228 which, in a preferred embodiment, are also formed of polypropylene. In an alternative embodiment, the finger placement pad 225 may be formed of other materials, however it is desired that the upstanding tabs 227, 228 be formed of a harder material than the finger placement pad area 235. The elongated finger placement pad 225 is received in the elongated hollow 220 of the handle 200 so that upstanding tabs 227, 228 are received by a pair of apertures 274 which are formed at the bottom of the cutout portion 271.

In a preferred embodiment, the handle 200 is formed of a metallic material, for example aluminum. Therefore, it may be understood that, upon assembly of the elongated finger placement pad 225 within the elongated hollow 220 of the handle 200, the elongated finger placement pad 225 is press-fit within the elongated hollow 220 so that the upstanding tabs 227, 228 are received within cutout portion apertures 274 so that the dimple 277 is exposed and in communication with the cutout portion 271. An opposing dimple (not shown) is also provided on the upstanding tab 228, which is received in a corresponding aperture opposite the aperture 274. The dimples 277 receive the bosses 266, 267 of the pivot member 264 of the strainer plate arm 262. In a preferred embodiment, the pivot member 265 is also formed of a polymer material, for example, polypropylene which provides for a rigid, yet somewhat flexible structure so that the bosses 266, 267 may be press-fit and received within dimples 277 of the upstanding tabs 227, 228. Alternate embodiments of the invention may provide a pivoting means of the strainer plate arm 262 and strainer plate assembly 240 (FIG. 6) other than described above, such as by other hinge, pivot or axial rotation means.

FIG. 5 depicts the presser arm 100 having an elongate aperture 120 for receiving an insert member 125 therein. The elongate aperture 120 may include upstanding support members 121 for providing vertical support to the insert member 125. The elongate aperture 120 runs from the distal end 114 to an area adjacent to proximal end 113 of the presser arm 100. Attached at the proximal end 113 is the presser plate 150 having presser plate arm 151 having a pair of pintels 155 for pivotal attachment to the presser arm 100. Also at the proximal end 113 is formed the hinge arm gap 115 and bore 118 for forming the hinge 300. In a preferred embodiment the presser arm 100 is formed of a metallic material, for example, aluminum A-380, and the insert member 125 is formed of a polymer material. In a preferred embodiment, the insert member 125 includes finger area 135 which is formed of Santoprene TPE which is over-molded onto the body area 137 which, in a preferred embodiment may be formed of polypropylene. Therefore, it may be understood that the insert member 125 may be quickly and easily inserted within the elongate aperture 120 by press fitting the sides of the body portion 137 within the elongate aperture 120 of the presser arm 100.

FIG. 6 shows the strainer plate assembly 240 having strainer plate 260 attached to strainer plate arm 262. The strainer plate arm 262 is shown disassembled from the pivot member 264. The strainer plate arm 262 includes a rectangular finger 281 protruding therefrom, which is received by a rectangular shaped aperture 269 formed within the pivot member 264. The rectangular shaped aperture 269 is precision formed so that the rectangular finger 281 may be friction-fitted therein. The pivot member 264 includes bosses 266, 267 upon which the pivot member 264 pivots when the strainer plate assembly 240 is mounted to the handle 200, as discussed above. In a preferred embodiment the strainer plate arm 262, strainer plate 260 and rectangular finger 281 are formed of a metallic material, for example aluminum. In a preferred embodiment the pivot member 264 is formed of a polymer material, for example polypropylene. Therefore, it may be understood that the strainer plate assembly 240 may be quickly and easily assembled by insertion of the rectangular finger 281 into the rectangular shaped aperture 269 of the pivot member 264. The entire assembly 240 may then be friction-fitted within the cutout portion 271 of the handle 200.

The strainer plate 260 includes perforated area 261 including the apertures 261 providing a straining surface through which a food article, for example, garlic may be pressed in order to separate the garlic skin from the garlic clove in order to release the juice from the clove. It may be further understood that after pressing of the garlic clove or other food article within the basket 250 of the handle 200, the strainer plate arm 262 may be pivoted from its position within the basket 250 adjacent the rim 253, to a second position orienting the strainer plate 260 above the upper face 299 (FIG. 3) of the handle 200, so that the perforations 261 of the strainer plate 260 may be easily cleaned by running the strainer plate under water and scrubbing with soap or cleaning pad. It may be understood that the pivoting of the pivot arm 262 allows for both the upper surface 262 and the lower surface 263 of the strainer plate 260 to be easily accessed and cleaned when the strainer arm 262 is in its second position above the upper face 299 of the handle 200. It may be understood that by pivotally attaching the strainer plate assembly 240 to the handle 200, it provides for its displacement from the basket 250. However, such displacement from the basket 250 occurs without detaching the strainer plate assembly from the handle 200 due to its pivoting attachment, in order to avoid inadvertent separating the strainer plate assembly 240 from the food press 10 so that the pieces of the strainer plate assembly 240 will not be misplaced. Only with application of intentional additional force and deliberation can the strainer plate assembly 240 be removed from the handle 200, as discussed above.

The matter set forth in the foregoing description and accompanying drawings is offered by way of illustration only and is not as a limitation. While particular embodiments have been shown and described, it would be obvious to those skilled in the art that changes and modifications may be made without departing from the broader aspects of applicant's contribution. The actual scope of the protection sought is intended to be defined in the following claims when viewed in their proper perspective based on the prior art.

What is claimed is:

1. A food press comprising:
   a presser arm including a proximal end and a presser plate pivotally attached to the presser arm and adjacent the proximal end;
   a handle having a proximal end, a basket operatively connected to and contiguous to said handle proximal end for receiving the presser plate therein and a perforated strainer plate pivotally attached to the handle by a pivot member and having an axis of rotation disposed so that the strainer plate may be positioned within the basket; and
   a hinge permanently connecting the proximal end of the presser arm to the proximal end of the handle and displaced from the axis of rotation of the pivot member.

2. The food press of claim 1 wherein the handle includes a cutout portion and the strainer plate is removably attached to the handle via the pivot member being press-fitted within the cutout portion of the handle.

3. The food press of claim 2 wherein the handle includes a pair of dimples and the pivot member includes a pair of bosses to be received by the pair of corresponding dimples formed in the handle.

4. The food press of claim 2 wherein the basket includes a side and the pivot member is attached to the handle at a the side of the basket opposite the hinge.

5. The food press of claim 1 wherein the basket includes a first end forming a generally cylindrical shaped opening for receiving the strainer plate and a second end forming a basket aperture communicating with a cutout portion of the handle for receiving the pivot member.

6. The food press of claim 5 wherein the basket aperture is open at both sides of the handle.

7. The food press of claim 5 wherein the opening includes a bottom aperture having a rim formed around its perimeter for receiving the strainer plate thereon and supporting the strainer plate against a force exerted by the presser plate.

8. The food press of claim 5 wherein the handle further includes a polymer pad and the cutout portion of the handle is formed of metal and the pivot member includes a pair of bosses that are press-fit to the polymer pad of the handle.

9. The food press of claim 8 wherein the polymer pad includes a pair of upstanding tabs received in apertures of the handle in order to expose a pair of dimples on the tabs within the cutout portion of the handle for receiving the pair of bosses.

10. The food press of claim 9 wherein the polymer pad includes a finger placement pad that is formed of an elastomeric material and the upstanding tabs and dimples are formed of polypropylene.

11. The food press of claim 5 wherein the handle includes a pad mounted thereto and the pad having a pair of upstanding tabs and the cutout portion includes a pair of apertures for receiving the upstanding tabs therein upon press-fitting of the pad into the handle, and the upstanding tabs for receiving the pivot member.

12. The food press of claim 1 wherein the strainer plate is formed of metal and bosses provided on a pivot member are formed of a polymer material.

13. The food press of claim 1 wherein the strainer plate includes an arm having a rectangular finger and the pivot member includes a rectangular shaped aperture for receiving the corresponding shaped rectangular finger protruding from the arm of the strainer plate that is press-fit within the pivot member aperture.

14. The food press of claim 1 wherein the pivot member is formed of polypropylene and the strainer plate, handle and presser arm are formed of aluminum.

15. The food press of claim 1 wherein the presser arm includes an insert member to contact a user's band during operation of the press.

16. The food press of claim 1 wherein the presser arm includes a presser arm insert member and an elongate aperture formed in the presser arm and shaped to allow for press-fitting of the insert member therein.

17. The food press of claim 1 wherein the food press includes an insert member 45 formed of an elastomeric material over-molded onto polypropylene.

18. A food press comprising:
a presser arm including a proximal end and a presser plate;
a hinge attached to the proximal end of the presser arm; and
a handle including a proximal end permanently attached to the hinge and the hinge providing a main pivot axis for the presser arm and the handle, the main pivot axis providing a first axis of rotation; and
a strainer plate pivotally attached to the handle via a pivot member, the strainer plate for receiving the presser plate thereon and the pivot member providing a second axis of rotation that is displaced from the first axis of rotation.

19. The food press of claim 18 wherein the pivot member is displaced from the main pivot axis.

20. The food press of claim 18 wherein the handle includes a basket for receiving the strainer plate therein.

21. The food press of claim 20 wherein the a presser plate is pivotally attached adjacent the proximal end of the presser arm and the presser plate received by the basket.

22. The food press of claim 20 wherein the basket has an opening and the strainer plate at least partially encloses the opening.

23. The food press of claim 20 wherein the strainer plate is perforated.

24. The food press of claim 20 wherein the basket is contiguous with the handle.

25. The food press of claim 20 wherein the hinge is formed integrally with the handle and the main pivot axis includes a pin attached to the proximal end of the presser arm providing the first axis of rotation.

26. A food press comprising:
a presser arm including a proximal end and a presser plate pivotally attached adjacent the proximal end;
a handle having a proximal end, a basket operatively connected to and contiguous to said handle proximal end for receiving the presser plate therein and a perforated strainer plate pivotally attached to the handle by a pivot member and having an axis of rotation disposed so that the strainer plate may be positioned within the basket, the strainer plate including an arm having a rectangular finger and the pivot member includes a rectangular shaped aperture for receiving the corresponding shaped rectangular finger protruding from the arm of the strainer plate that is press-fit within the pivot member aperture; and
a hinge connecting the proximal end of the presser arm to the proximal end of the handle and displaced from the axis of rotation of the pivot member.

27. A food press comprising:
a presser arm including a presser plate and a first abutment face extending longitudinally along the presser arm;
a handle including a basket for receiving the presser plate, a second abutment face extending longitudinally along the handle and generally parallel to a longitudinal axis of the handle and a hinge for pivotally connecting the presser arm to the handle so that in a closed position when the presser plate is received in the basket, the first and second abutment faces are in a side by side orientation;
a strainer plate having a pivot member attached to the handle at an attachment point, the attachment point displaced from the hinge and disposed along the second abutment face adjacent the basket, so that the strainer plate may be pivoted from a working position at a bottom of the basket to a cleaning position by moving the strainer plate through the basket and through the longitudinal axis of the handle so tat the strainer plate is extended beyond the second abutment face.

28. The food press of claim 27 wherein the handle includes an upper face contiguous with the second abutment face and surrounding the basket and the strainer plate may be pivoted out of the basket to extend beyond the upper face.

29. The food press of claim 27 wherein the hinge is attached at a first side of the basket and the pivot member is attached at a second side of the basket, opposite the first side.

30. A food press comprising:
a presser arm including a presser plate;
a handle including a basket having a generally cylindrical shape, an open bottom forming a rim and an opposite open top;
a hinge disposed between the presser arm and the handle so that the presser plate can be pivoted into the basket upon rotation of the presser arm toward the handle;
a strainer plate including a pivot member attached to the handle displaced from the hinge and adjacent the open top of the basket so that the stainer plate is pivotable between a working position at the bottom of the basket and a cleaning position elevated beyond the open top of the basket.

31. The food press of claim 30 wherein the handle includes a cut-out portion for receiving the pivot member of the strainer plate and the cut-out portion forms a cavity extending longitudinally along the handle and in communication with the open top of the basket.

32. The food press of claim 31 wherein the strainer plate includes a strainer arm extending from the strainer plate and the strainer arm received in the cut-out portion of the handle and the strainer arm pivots in and out of the cavity.

33. The food press of claim 30 wherein the hinge is attached to the handle.

34. The food press of claim 30 wherein the hinge is attached to the handle at a first side of the basket and the pivot member is attached at a second side of the basket, opposite the first side.

\* \* \* \* \*